United States Patent [19]
Kellenbach

[11] Patent Number: 4,744,429
[45] Date of Patent: May 17, 1988

[54] LOAD MEASUREMENT

[76] Inventor: Arthur Kellenbach, 46 Waipori Street, St. Ives, N.S.W., 2075, Australia

[21] Appl. No.: 835,851
[22] PCT Filed: Jun. 26, 1985
[86] PCT No.: PCT/AU85/00140
   § 371 Date: Feb. 11, 1986
   § 102(e) Date: Feb. 11, 1986
[87] PCT Pub. No.: WO86/00700
   PCT Pub. Date: Jan. 30, 1986

[30] Foreign Application Priority Data

Jul. 4, 1984 [AU] Australia .............................. PG5843
Sep. 21, 1984 [AU] Australia .............................. PG7258
Feb. 15, 1985 [AU] Australia .............................. PG9310
Apr. 24, 1985 [AU] Australia .............................. PG0293

[51] Int. Cl.[4] .............................................. G01G 3/14
[52] U.S. Cl. ............................. 177/211; 177/DIG. 1
[58] Field of Search ........................ 177/211, DIG. 9

[56] References Cited

U.S. PATENT DOCUMENTS 4,078,623 3/1978 Ohta et al. ...................... 177/147 X
4,315,554 2/1982 Williamson ................... 177/DIG. 9
4,611,678 9/1986 Andriewsky ......................... 177/211

FOREIGN PATENT DOCUMENTS

WO85/01796 4/1985 U.S.S.R. .............................. 177/211

Primary Examiner—George H. Miller, Jr.
Attorney, Agent, or Firm—Beveridge, DeGrandi & Weilacher

[57] ABSTRACT

A load is applied to a beam, and the strain is measured at a selected region of the beam to determine the magnitude of the load. Downwardly directed load forces and upwardly directed reaction forces are transmitted to the beam by force receiving members which include resilient bodies lying within the lateral side boundaries of the beam.

35 Claims, 6 Drawing Sheets

LOAD MEASUREMENT

TECHNICAL FIELD

This invention relates to apparatus for the measurement of forces, and has particular application to weighing apparatus. Although primarily developed for the weighing of large and awkward loads, such as livestock and large industrial loads, the invention will have applicability in other areas as well, and indeed a feature of the invention is its applicability in a wide variety of load measuring applications.

The invention is particularly concerned with techniques for the application of forces to bending beams, so that forces may be measured by the use of strain measuring devices

BACKGROUND ART

U.S. Pat. No. 2,899,191 discloses a weighing scale in which a weighing platform is supported on a pair of beams. The beams are supported adjacent their outer ends on knife edges, and the platform is supported on the beams by journals comprising pins mounted in lugs, the pins being spaced inwardly equal distances from the knife edges. A strain gauge is mounted at the centre of each beam.

Such an arrangement has the advantage that, in principle, the bending moment at the centre of the beam will be proportional to the sum of the forces applied to the journal pins, so that measuring the strain at the centre of each beam will provide a measure of the total load on the platform.

An arrangement such as that described in the Hunt U.S. patent, is found to suffer from serious disadvantages as a result of the manner of support and of application of load to the beams on which the strain gauges are mounted. Thus, for example, any misalignments, and slope or unevenness in the supporting surface will be transmitted as twisting or bending forces to the beam, and significant inaccuracy may result.

In U.S. patent specification No. 4,287,958 another approach to load summation using a similar configuration of forces and strain gauge is disclosed, in this case in the form of a load measuring vehicle suspension. In this specification the load receiving journals are located so that their axes intersect the beam axis, and are provided by elastomeric bushings on stub shafts which extend on either side of the beam at each of the load application points. As the journals are located outwardly of the beam, however, the arrangement is prone to the production of twisting forces which will interfere with accurate measurement. Furthermore, the manner in which the ends of the beam in this disclosure are mounted, encourages the transmission to the beam of torsional forces, as well as spurious bending moments, from these mountings wherever misalignment occurs.

DISCLOSURE OF INVENTION

Although the prior art devices discussed above approach the problem of load measurement in a way which has an elegant mathematical basis which is employed in the preferred embodiments of the present invention, the realisation of this approach in those prior art devices has involved structures which allow considerable inaccuracy to arise from misalignment of the apparatus. Thus, for example, the structures disclosed in the U.S. patents discussed above, will produce considerable inaccuracies where loads are applied to the beam in such a way as to produce twisting effects, or where the beam is supported so as to produce twisting, or misalignment of the applied loads.

The prior art approach has involved emphasis on the maintenance of those dimensions in the geometry of the apparatus which mathematically determine the operation of the equipment, such as the distance between points of application of forces. The present invention however, is based on the recognition that in the use of strain determination for load measurement, errors caused by spurious strain arising from forces which result from misalignment of the apparatus or the angular application of load forces, may be much greater than errors which may result from dimensional inaccuracies or dimensional changes, and therefore that a system which reduces such spurious strain at the cost of dimensional accuracy may give more accurate load measurement in practical conditions of use.

In one aspect the invention broadly resides in load measuring apparatus in which a load force is applied to a beam in equilibrium with a pair of reaction forces and the strain in the beam is measured at a selected region thereof, said load force and said reaction forces being applied to respective force receiving means spaced from one another in the longitudinal direction of the beam, characterised in that the connection between the beam and at least one of said force receiving means comprises a resilient body at least a portion of which, operative to transfer force to the beam from the associated force receiving means, lies within the lateral boundaries of the beam.

Typically, the beam will provide four points of force application, two for the load to be measured and two for the support of the beam, but an embodiment with three force application points will be described.

In one embodiment of the invention, the resilient body comprises a flexible bush and each load receiving means comprises a pin received by this bush.

In a second embodiment, the resilient body comprises a body of resilient material located between the beam and the respective load force receiving means.

In either case, the resilient body may extend beyond the lateral confines of the beam if this is required for purposes other than the transfer of force to the beam, but that portion of the body by which force is applied to the beam, should be within the lateral boundaries of the beam. In this context throughout this specification the "lateral boundaries" of the beam are considered as extending beyond the beam itself in planes parallel to the longitudinal axis of the beam and to the general direction of the load and reaction forces, so that while in some embodiments, the resilient members are not within the beam itself, they are within its lateral boundaries extended in that way.

MODES OF CARRYING OUT THE INVENTION

Figure 1:
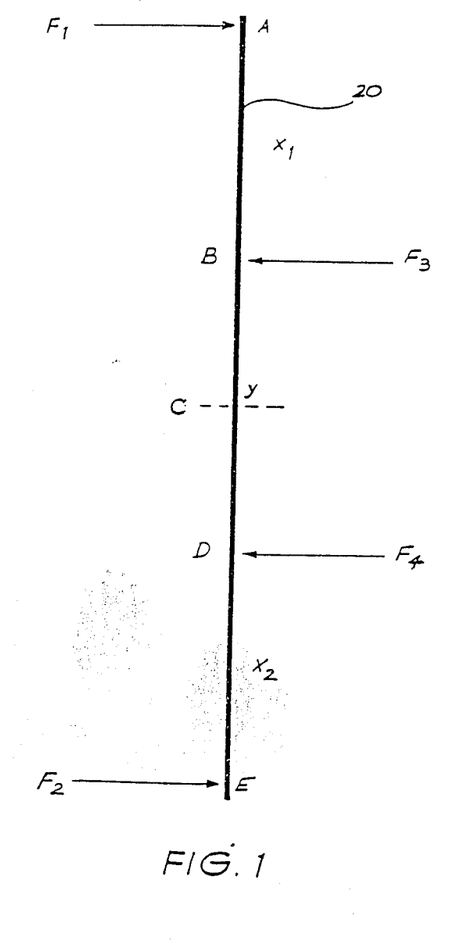
FIG. 1 is a force diagram.

The force diagram of FIG. 1 shows a beam 20 of a material which exhibits a linear relationship between bending moment and strain, to which is applied a pair of load forces $F_1$ and $F_2$, and which is maintained in equilibrium by reaction forces $F_3$ and $F_4$, these forces being applied respectively at the points A, E, B and D. It can easily be shown that the strain in the beam 20 at the point C, equidistant between the forces $F_3$ and $F_4$, is proportional to the sum of the products $F_1 x_1$ and $F_2 x_2$ where $x_1$ and $x_2$ are respectively the distance between the lines of action of the forces $F_1$ and $F_3$, and the forces $F_2$ and $F_4$. In the special case where $x_1$ equals $x_2$, it will be seen that the strain at the point C represents the sum of the forces $F_1$ and $F_2$ or, if the applied forces are $F_3$ and $F_4$, then the strain at C will represent the sum of $F_3$ and $F_4$ and can be measured by locating strain gauges at the point C.

Figure 2:
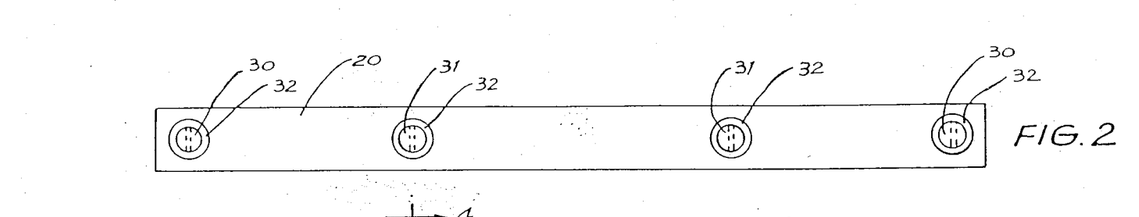
FIG. 2 is a side elevation of a load measuring beam constructed in accordance with a first embodiment of the present invention.
Figure 3:
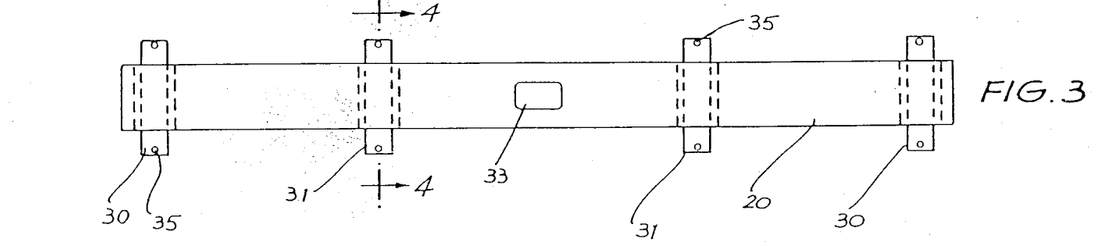
FIG. 3 is plan view of the beam shown in FIG. 2.
Figure 4:
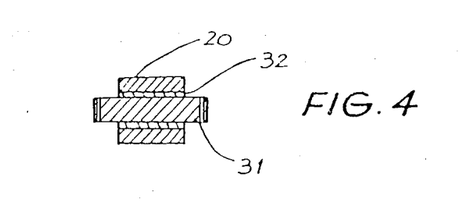
FIG. 4 is a lateral section taken on the lines 4—4 of FIG. 3.

FIGS. 2 to 8 illustrate one practical realisation of the schematic arrangement shown in FIG. 1. FIGS. 2 to 4 show a rectangular beam 20 provided with strain gauges 33 (or other suitable strain measuring device) at its centre. Two pairs of pins 30 and 31 are mounted within holes in the bar 20 by means of bushes 32, of flexible material as is discussed below. The pins 30 and 31 are preferably located on the neutral axis of the beam 20, which in this case is equidistant from the upper and lower surfaces of the beam. Where the beam geometry is more complex, the neutral plane is preferably determined in order that the pins 30 and 31 may be located in or close to it.

The distance between each of the pins 30 by which the beam is supported, and the pins 31 receiving the load forces to be measured are accurately set as equal, and the strain gauges 33 are, in the preferred arrangement, located equidistantly between the pins 31.

The bushes 32 may be bonded to the beam 20, or may simply be retained within the beam by friction, assisted by external washers as described below.

Holes 35 may be provided in the outer ends of the pins 30 and 31 for the reception of split pins or the like.

The sleeves 32 may be of polyurethane and this may be in the hardness range of Duro-A 90-95 although softer and harder forms may be used, the hardness depending on the load forces for which the device is designed. Naturally, alternative elastomeric materials may be selected for the transfer of the forces to the beam and these may be more or less elastic than those described herein. Inelastic bearings may be found acceptable for some of the force application points in some applications of the device, but it is always preferred to use bearings which provide sufficient elasticity to reduce the transmission to the beam of bending moments or stresses which result from misalignment of the apparatus, as it has been found that the errors otherwise resulting from such stresses can be expected to be greater than the errors which may result from the small changes of effective pin distance which may result from the use of resilient force receiving arrangements.

FIGS. 5 to 8 show a weighing platform assembly employing the beam of FIGS. 2 to 4. The beam 20 is provided with an upper load receiving member 21 of channel shape supported on the pins 31 which are in turn engaged in apertures in the side walls 22 of this channel. The beam 20 is supported by the engagement of the pins 30 with the side walls 24 of a channel-shaped lower support member 23. The side walls 24 are cut away to clear the pins 31.

Resilient washers 34 are fitted on the exposed portions of the pins 30 and 31, to assist in isolating the beam from extraneous stress or bending by components attached to the pins, and to assist in locating the sleeves 32 within the bar in those cases where these sleeves are not bonded or otherwise fixed to the bar.

Figures 5, 6, 7, 8:
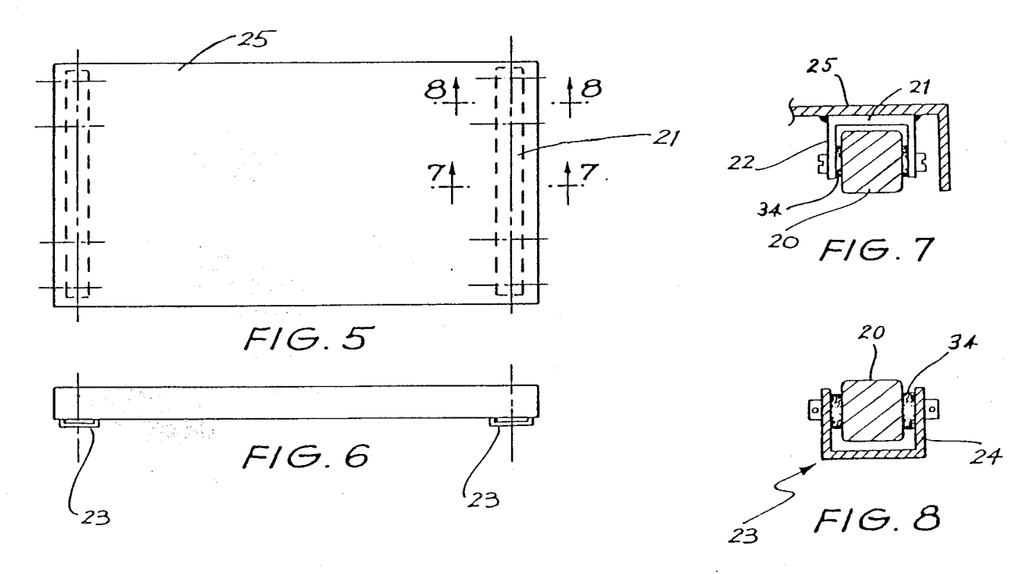
FIG. 5 is a plan view of a weighing platform assembly employing beams constructed in accordance with FIGS. 2 to 4.
FIG. 6 is a side elevation of the weighing platform assembly of FIG. 5.
FIG. 7 is a fragmentary section taken on the line 7—7 of FIG. 5.
FIG. 8 is a fragmentary section taken on the line 8—8 of FIG. 5.

A weighing platform 25 is supported on the members 21 of two such beam assemblies, and in known manner the strain gauges 33 of each beam 20 are connected with measuring equipment to obtain the sum of forces applied to the two beams 20.

By applying the loads to the beam by means of pins mounted within polyurethane bushes which are in turn mounted in holes in the beam, it is found that a self-aligning characteristic is obtained, whereby should, for example, the members 23 be mounted out of the horizontal, the line on which forces are transferred to the bar is centred by distortion of the bushes, and a mounting of this type provides a valuable contribution to the accuracy of the performance of the device in the field. As mentioned above, suitable materials other than polyurethane may be employed for these bushes.

Figures 9, 10, 11, 12:
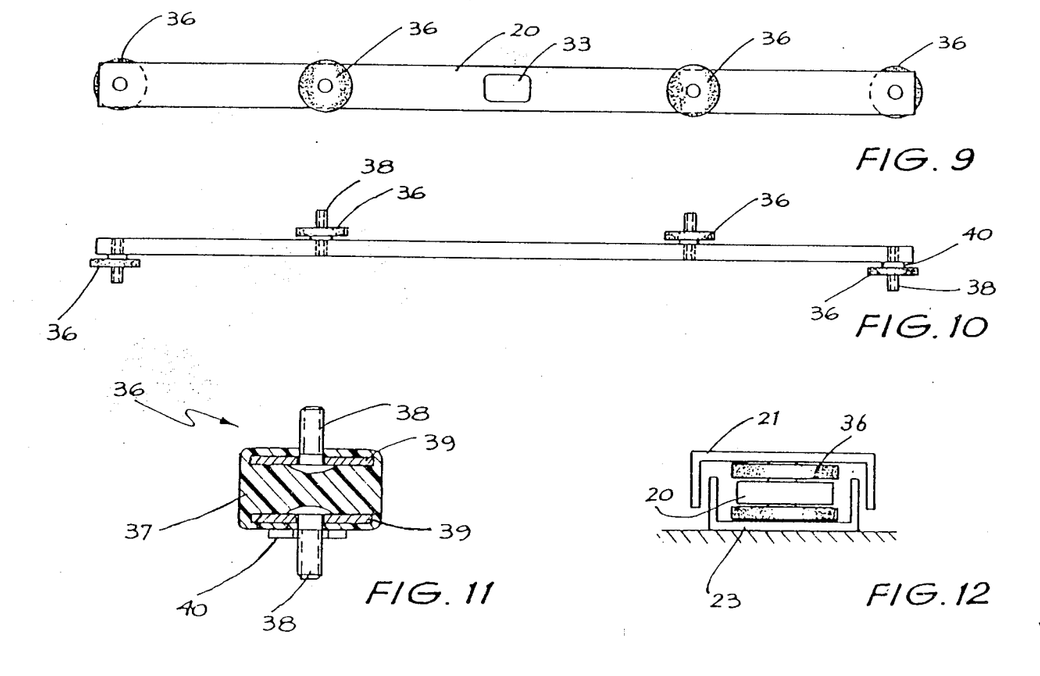
FIG. 9 is a plan view of a load measuring beam constructed in accordance with a second embodiment of the present invention.
FIG. 10 is a side elevation of the beam of FIG. 9.
FIG. 11 shows on an enlarged scale and in cross-section, a load receiving device suitable for use in the embodiment illustrated in FIGS. 9 and 10.
FIG. 12 shows in end elevation, a beam as illustrated in FIGS. 9 and 10 assembled with load carrying and support channels.

The weighing beam illustrated in FIGS. 9 to 12 shows a different approach to the manner of application of the support and load forces to the beam 20. Instead of pins and bushes passing through the beam, in this case each force application point is provided with a resilient load receiving member 36 which is shown in sectional view in FIG. 11, and comprises a resilient body 37, again preferably of polyurethane, to which a pair of threaded pins 38 are attached by means of embedded plates 39. The beam 20 is drilled to receive the pins 38 and each load or support application point, and in a manner similar to that of the earlier embodiment, the beam 20 may be assembled as shown in FIG. 12, with upper and lower channels 21 and 23, respectively attached to the load receiving and support mountings, by means of the respective pins 38. Preferably, the body 37 is spaced from the beam 20 by means of spacing washers 40 on the pins 38.

Again in this case, it is found that misalignment of the apparatus or of the load forces is accommodated by the resilient load receiving members 36, and greater accuracy under conditions of misalignment is obtained than that which can be achieved with the use of rigid load receiving structures used in the prior art.

Figure 13:
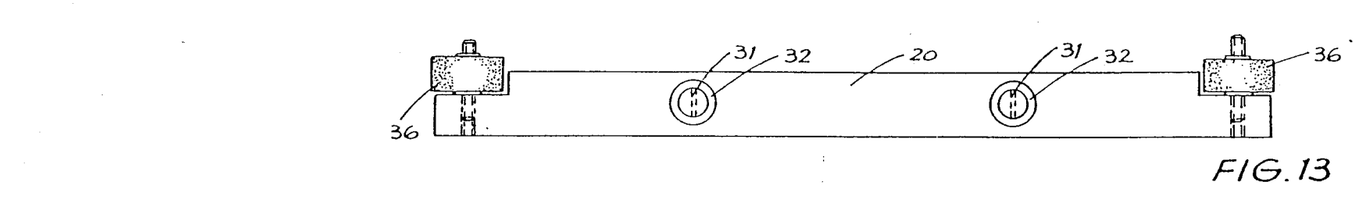
FIG. 13 shows in side elevation a beam according to a third embodiment of the present invention.
Figure 14:
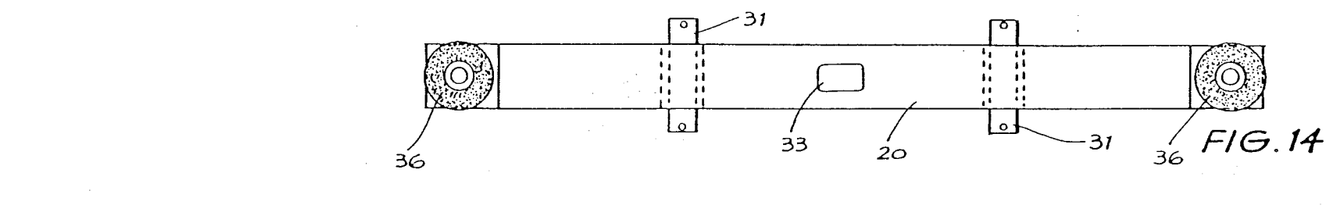
FIG. 14 shows a plan view of the beam of FIG. 13.

The load receiving members of the embodiment last mentioned, may be combined with load receiving members in the form of pins and bushes as described in the first embodiment, and an example of this combination is shown in FIGS. 13 and 14, where the centre, support members comprise pins 31 and resilient bushes 32, while the outer, load receiving members 36 are constructed in accordance with FIG. 11. It will be observed that the load receiving members 36 are in this case mounted in portions of the bar which are relieved to enable the members 36 to be located closer to the neutral plane of the beam 20 and to the plane of the pins 31.

Where necessary, in order to obtain the most desirable relationship between the forces applied to the device, and the preferred magnitude of strain at the measuring point, the geometry of the beam may be modified. For example, the central portion of the beam between the inner pair of forces, whether these are reaction forces or load forces, may be of reduced cross-section. In other embodiments of the invention, the central portion of the beam may be constructed of a material different from that of the outer portion of the beam, and chosen for its suitability for strain measurement.

Figure 15:
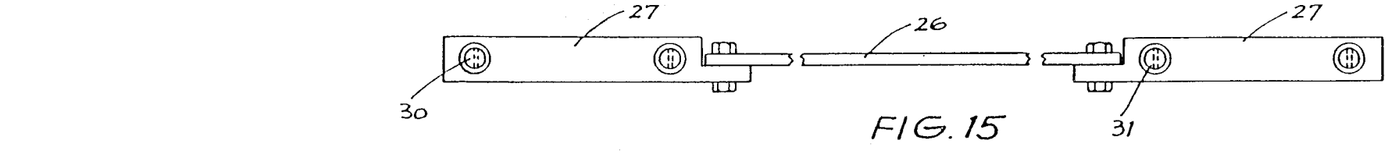
FIG. 15 shows in side elevation, a beam according to a fourth embodiment of the present invention.
Figure 16:
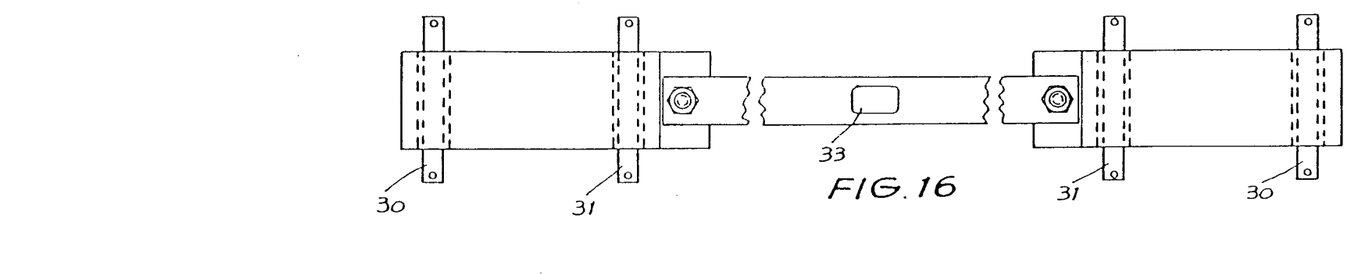
FIG. 16 is a plan view of the beam of FIG. 15.

A useful arrangement is shown in FIGS. 15 and 16, where a central sensing bar 26 carrying the strain sensing device 33, is attached to actuator bar portions 27 which are provided with the support and load receiving means, such as pins 30 and 31. By adopting such an arrangement, standardised actuator portions 27 can be manufactured for use with sensing bars 26 of dimensions and material chosen as the most suitable for particular applications.

Reference to FIG. 1 and the accompanying discussion will reveal that since a device of the kind thus far described accurately provides the sum of the applied forces, it will accurately measure one of those forces where the other force is zero, so that where it is required only to measure a load at a single point of application, the same device may be used, and if desired the redundant pin and bearing assembly may be deleted. Such a modified device is illustrated in FIG. 17.

Figure 17:
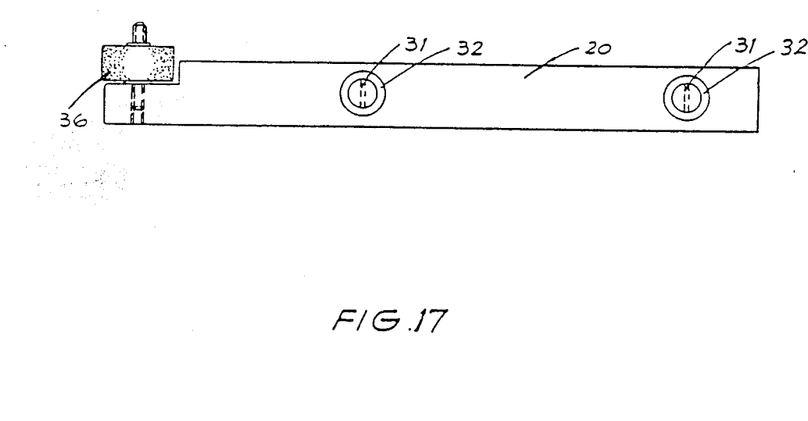
FIG. 17 is a side elevation of a beam according to a further embodiment of the invention.

The beam 20 of FIG. 17 may be supported by means such as those shown in FIGS. 7 and 8, and the force to be measured may be applied to the member 36 by any suitable means. The member 36 may of course be replaced by a pin 30 of the type previously described, and in either case the pins 31 may be replaced by resilient members 36.

It will be noted that in the illustrated embodiments only one strain measuring location 33 is employed, on the upper side of the bar 20. While a pair of devices may be used, one on the upper surface and one on the lower surface of the bar, the use of a single location has been found to give satisfactory results and avoids the additional complexity and cost of providing wiring to both sides of the bar.

While the strain measuring device will normally, as in the embodiments described above, consist of strain gauges of conventional type, it is to be appreciated that the means by which the strain in the beam is measured is not an essential characteristic of the invention and other strain masuring techniques may be employed.

The material used for the beam or beam components in the various embodiments of the invention described herein will be chosen from those presenting suitable physical properties and exhibiting satisfactory linearity in the relationship between bending moment and strain. Heat treated steels may be chosen with acceptable properties.

I claim:

1. Load measuring apparatus in which a load force is applied to a beam in equilibrium with a pair of reaction forces and the strain in the beam is measured at a selected region thereof, said load force and said reaction forces being applied to respective force receiving means spaced from one another in the longitudinal direction of the beam, characterised in that the connection between the beam and at least one of said force receiving means comprises a resilient body at least a portion of which, operative to transfer force to the beam from the associated force receiving means, lies substantially within the lateral side boundaries of the beam.

2. Load measuring apparatus according to claim 1 wherein the connection between each load force receivving means and the beam comprises such a resilient body.

3. Load measuring apparatus according to claim 1 wherein the connection between each reaction force receiving means and the beam comprises such a resilient body.

4. Load measuring apparatus according to claim 1 wherein the or at least one of said resilient bodies comprises a sleeve of resilient material mounted within said beam.

5. Load measuring apparatus according to claim 4 in which the force receiving means associated with said sleeve is a pin of rigid material mounted within said sleeve.

6. Load measuring apparatus according to claim 1 wherein the or at least one of said resilient bodies comprises a body of resilient material located between the beam and the respective load force receiving means.

7. Apparatus according to claim 1 wherein each of said reaction force receiving means comprises a pin mounted within the beam by means of a sleeve of resilient material comprising said resilient body.

8. Apparatus according to claim 7 further comprising beam support means, each pin of said reaction force receiving means extending laterally of the beam for engagement with said support means.

9. Apparatus according to claim 8 wherein said support means comprises a channel member extending substantially the length of the beam and comprising a base and a pair of upstanding side flanges, said pins being supported by said flanges.

10. Apparatus according to claim 1 comprising two load force receiving means in order to obtain by measuring said strain, the sum of two load forces.

11. Apparatus according to claim 10 wherein each said load force receiving means comprises a pin mounted within the beam by means of a sleeve of resilient material comprising said resilient body.

12. Apparatus according to claim 11 further comprising load transfer means, each pin of said reaction force receiving means extending laterally of the beam for engagement with said transfer means.

13. Apparatus according to claim 12 wherein said transfer means comprises a channel member extending substantially over the length of the beam and comprising a web and a pair of side flanges, said pins being engaged with said flanges such that a load applied to said transfer means is transmitted to said pins.

14. Apparatus according to claim 11 wherein each of said reaction force receiving means comprises a pin mounted within the beam by means of a sleeve of resilient material comprising said resilient body.

15. Apparatus according to claim 1 comprising two load force receiving means in order to obtain by measuring said strain, the sum of two load forces, said load force receiving means each comprising a body of resilient material located between said beam and the respective load receiving member.

16. Apparatus according to claim 15 further comprising load transfer means extending longitudinally of said beam for engagement with said load force receiving means.

17. Apparatus according to claim 16 wherein said load transfer means comprises a channel member extending substantially over the length of the beam and comprising a web and a pair of side flanges extending from said web towards said beam, said web engaging said load force receiving means.

18. Apparatus according to claim 15 wherein each of said reaction force receiving means comprises a pin mounted within the beam by means of a sleeve of resilient material comprising said resilient body.

19. Apparatus according to claim 15 wherein each force receiving member further comprises beam-engaging pin means fixed to said body and extending therefrom.

20. Apparatus according to claim 19 wherein each force receiving member further comprises force-receiving pin means fixed to said body and extending therefrom in a direction opposite to that of said beam-engaging pin means.

21. Apparatus according to claim 20 wherein each said pin means is fixed to said body by means embedded in said body.

22. Apparatus according to claim 21 wherein said embedded means comprises a plate attached to said pin means.

23. Apparatus according to claim 19 wherein each said pin means is fixed to said body by means embedded in said body.

24. Apparatus according to claim 23 wherein said embedded means comprises a plate attached to said pin means.

25. Apparatus according to claim 20 wherein said beam is provided with holes for the reception of the pin means of each force-receiving member.

26. Apparatus according to claim 1 wherein each of said reaction force receiving means comprises a body of resilient material located between the beam and the respective load receiving member.

27. Apparatus according to claim 26 wherein each of said load force receiving means comprises a pin mounted within the beam by means of a sleeve of resilient material comprising said resilient body.

28. Apparatus according to claim 26 comprising two load force receiving means in order to obtain by measuring said strain, the sum of two load forces, said load force receiving means each comprising a body of resilient material located between said beam and the respective load receiving member.

29. Apparatus according to claim 1 comprising single load receiving means comprising a body of resilient material located between the beam and the load force receiving means.

30. Apparatus according to claim 29 wherein each of said reaction force receiving means comprises a pin mounted within the beam by means of a sleeve of resilient material comprising said resilient body.

31. Apparatus according to claim 29 wherein each of said reaction force receiving means comprises a body of resilient material located between the beam and the respective load receiving member.

32. Apparatus according to claim 1 comprising single load force receiving means comprising a pin mounted within the beam by means of a sleeve of resilient material comprising said resilient body.

33. Apparatus according to claim 32 wherein each of said reaction force receiving means comprises a pin mounted within the beam by means of a sleeve of resilient material comprising said resilient body.

34. Apparatus according to claim 32 wherein each of said reaction force receiving means comprises a body of resilient material located between the beam and the respective load receiving member.

35. Apparatus according to claim 1 wherein said beam comprises a first beam portion including said selected region, said first portion lying between second and third portions attached to said first portion and carrying said force receiving means.

* * * * *